United States Patent
Martens et al.

(10) Patent No.: US 11,572,875 B2
(45) Date of Patent: Feb. 7, 2023

(54) UNLOADER FOR A COMPRESSOR AND SERVICING THEREOF AND COMPRESSOR PROVIDED WITH AN UNLOADER

(71) Applicant: ATLAS COPCO AIRPOWER, NAAMLOZE VENNOOTSCHAP, Wilrijk (BE)

(72) Inventors: Kristof Adrien Martens, Wilrijk (BE); Pieter De Schamphelaere, Wilrijk (BE); Daniel Joseph Smith, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 0 days.

(21) Appl. No.: 16/962,400

(22) PCT Filed: May 17, 2018

(86) PCT No.: PCT/IB2018/053462
§ 371 (c)(1),
(2) Date: Jul. 15, 2020

(87) PCT Pub. No.: WO2019/155272
PCT Pub. Date: Aug. 15, 2019

(65) Prior Publication Data
US 2021/0003125 A1    Jan. 7, 2021

(30) Foreign Application Priority Data
Feb. 9, 2018    (BE) .................................. 2018/5079

(51) Int. Cl.
*F04B 49/03*    (2006.01)
*F04B 39/14*    (2006.01)
*F16K 31/122*    (2006.01)

(52) U.S. Cl.
CPC .............. *F04B 49/03* (2013.01); *F04B 39/14* (2013.01); *F16K 31/122* (2013.01)

(58) Field of Classification Search
CPC .... F04B 49/03; F04B 49/225; F04B 39/1013; F04B 39/14; F01L 9/16; F16K 31/122; F16K 31/1221; F16K 31/1223
See application file for complete search history.

(56) References Cited

U.S. PATENT DOCUMENTS 1,291,854 A * 1/1919 Haight .................... F04B 49/24
                                                    137/599.18
1,653,110 A    12/1927 Valley
(Continued)

FOREIGN PATENT DOCUMENTS

FR    2 341 738 A1    9/1977
JP    09303605 A  *  11/1997
WO    03/102386 A1    12/2003

OTHER PUBLICATIONS

English Machine Translation of JP-09303605-A Abstract (Year: 1997).*
(Continued)

*Primary Examiner* — Nathan C Zollinger
(74) *Attorney, Agent, or Firm* — Sughrue Mion, PLLC

(57) ABSTRACT

Unloader for a compressor, said unloader (1) comprising a housing (2) with an inlet (3) and an outlet (4), and whereby the unloader (1) is further provided with a piston rod (5) which is arranged moveably in a reciprocating manner in the housing (2), whereby on one end (5a) of the piston rod (5) a valve (7) is provided to be able to close the outlet (4) and whereby on the other end (5b) of the piston rod (5) a piston (8) is arranged, the piston being arranged moveably in a reciprocating manner in a thereto provided cavity (9) of the unloader (1), said cavity (9) being at least partially delimited by a lid (10) which is provided on the housing (2) and which
(Continued)

Figure 1:
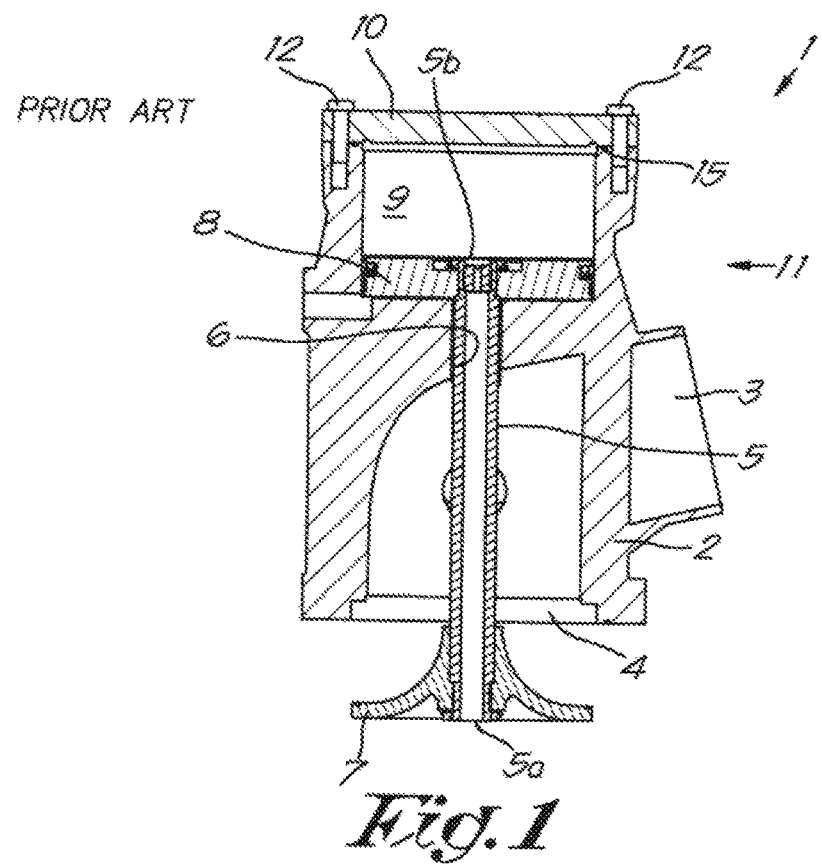

is also part of the unloader (1), whereby sealing means (11) are provided for the leakage-free movement of the piston (8) in said cavity (9), whereby the cavity (9) in which the piston (8) is arranged moveably in a reciprocating manner is provided at least partially in the lid (10).

10 Claims, 2 Drawing Sheets

(56) References Cited

U.S. PATENT DOCUMENTS

| | | | | |
|---|---|---|---|---|
| 1,969,507 A | | 8/1934 | Gehres | |
| 3,290,003 A | * | 12/1966 | Kessler | F16K 27/08 251/318 |
| 3,307,574 A | * | 3/1967 | Anderson | F16K 31/122 277/516 |
| 3,771,912 A | * | 11/1973 | Conlee | F04B 53/14 417/397 |
| 4,362,475 A | * | 12/1982 | Seitz | F04B 49/243 251/63.6 |
| 4,396,345 A | | 8/1983 | Hutchinson | |
| 4,763,562 A | * | 8/1988 | Haytayan | B25C 1/042 251/357 |
| 6,026,587 A | * | 2/2000 | Cunkelman | F04B 49/03 417/243 |
| 6,397,892 B1 | | 6/2002 | Pyle et al. | |
| 6,568,925 B2 | * | 5/2003 | Gunderson | F04B 15/02 417/396 |

OTHER PUBLICATIONS

International Search Report for PCT/IB2018/053462 dated, Oct. 15, 2018 (PCT/ISA/210).
Written Opinion of the International Searching Authority for PCT/IB2018/053462 dated, Oct. 15, 2018 (PCT/ISA/237).

* cited by examiner

UNLOADER FOR A COMPRESSOR AND SERVICING THEREOF AND COMPRESSOR PROVIDED WITH AN UNLOADER

CROSS REFERENCE TO RELATED APPLICATIONS

This application is a National Stage of International Application No. PCT/IB2018/053462 filed May 17, 2018, claiming priority based on Belgian Patent Application No. BE2018/5079, filed Feb. 9, 2018.

The present invention relates to an unloader for a compressor and more specifically an unloader with improved servicing.

An unloader is a valve which is mounted on the level of the inlet of a compressor and which will control the amount of air a compressor can suck in. By opening and closing the compressor's air inlet using the unloader, the capacity of the compressor can be controlled.

A problem with existing unloaders is in the servicing of the unloader, whereby the seal and the slide ring need to be replaced at regular times, approximately annually. To this end the unloader needs to be demounted.

In the existing unloader of FIG. 1 for example, the unloader needs to be detached from the compressor and subsequently the lid needs to be removed by unscrewing eight prestressed bolts to replace the seal and the slide ring. Subsequently the piston rod can be uncoupled from the piston by taking apart the ring, the screw and the washer. In short, many actions are required to get to the seal and the slide ring. Consequently, there is a greater risk of errors or mistakes.

Moreover, all these actions need to be performed again in the reverse order to mount the unloader on the compressor again after replacement of the seal and the slide ring.

Another problem is that a typical unloader weighs approximately thirty kilograms, making demounting of the unloader from the compressor a hard job.

An additional problem is that the compressor, once the unloader has been removed, shows a big opening in which dirt or the like can end up. This dirt ends up directly in the inlet of the compressor and can cause considerable damage there.

Another problem occurs when mounting it again after servicing. After installation, the seal on the piston will be fixed in the unloader largely blindly and using force, such that it can be damaged, resulting in an inadequate sealing.

U.S. Pat. No. 6,397,892 describes a similar known type of unloader to vary the internal volume of a reciprocating compressor cylinder. On dismantling it for servicing, the whole lid, consisting of the components 76, 74, 78, 72 and 40, needs to be unscrewed. However, the piston rod is not exposed hereby, such that it is not possible to replace the seal and/or the slide ring of the piston.

The purpose of the present invention is to provide a solution to at least one of the aforementioned and/or other disadvantages.

To this end, the invention relates to an unloader for a compressor, the unloader comprising a housing with an inlet and an outlet, and whereby the unloader is further provided with a piston rod which is arranged moveably in a reciprocating manner in the housing, whereby on one end of the piston rod a valve is provided to be able to close the outlet and whereby on the other end of the piston rod a piston is arranged, the piston being arranged moveably in a reciprocating manner in a thereto provided cavity of the unloader, said cavity being at least partially delimited by a lid which is provided on the housing and which is also part of the unloader, whereby sealing means are provided for the leakage-free movement of the piston in said cavity, characterised in that the cavity in which the piston is arranged moveably in a reciprocating manner is provided at least partially in the lid.

The advantages are that the lid is made such that by removing the lid, the slide ring and the seal are easily accessible.

Consequently, the entire unloader does not have to be demounted to replace the sealing means. Only the lid needs to be removed, whereby this lid only weighs a fraction of the entire unloader, typically only one and a half kilograms, and consequently is much easier to handle.

The consequence is also that the number of actions that has to be performed to replace the sealing means can be limited. For example, the piston rod no longer has to be detached from the piston.

Moreover, the inlet opening of the compressor will not be exposed, such that there is no risk that dirt or the like will end up in the compressor.

It is not excluded for the invention that the cavity is entirely provided in the lid.

In a preferred embodiment the lid is made as a cylindrical casing and a hood whereby the piston is arranged moveably in a reciprocating manner in the casing.

Alternatively, the lid can for example also be made thicker and provided with a shaft in which the piston is arranged moveably in a reciprocating manner.

In a special embodiment the sealing means are provided between a sealing surface of the piston and a sealing surface of the lid.

This means the sealing means will ensure the sealing between the piston and the cavity in the lid. Said sealing surfaces of the piston and the lid will come into contact with each other.

In another embodiment said sealing means of the piston comprise a seal and/or a slide ring.

This seal can for example comprise a single-acting seal.

Preferably, the lid is attached detachably on the housing by means of bolts.

In a special embodiment, said cavity is entirely integrated or located in the lid.

The piston and the sealing means are freely accessible when the lid is removed.

In a specific embodiment, the lid is provided with a handle or handgrip.

The invention also relates to a method to replace the sealing means of an unloader as described above, said method comprising the following steps:
a) demounting the lid of the housing such that the piston becomes freely accessible;
b) replacing one or several sealing means; and
c) mounting the lid on the housing.

The invention also relates to a compressor provided with a compressor element with an inlet for gas to be compressed and an outlet for compressed gas, said compressor being provided with an unloader with the characteristics of claim 1, said unloader with its outlet being connected to said inlet for gas to be compressed.

Figure 2:
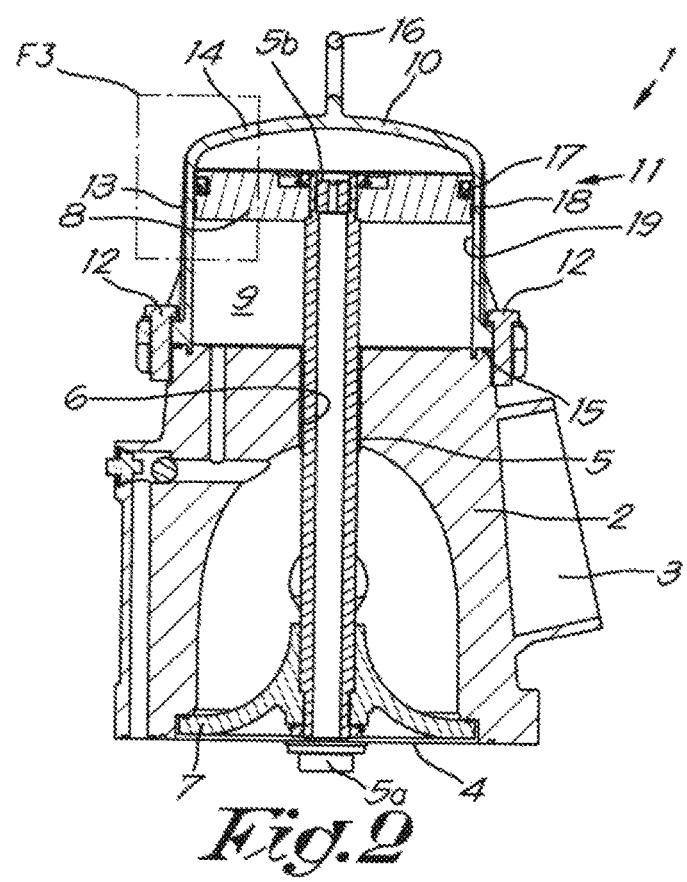
Figure 3:
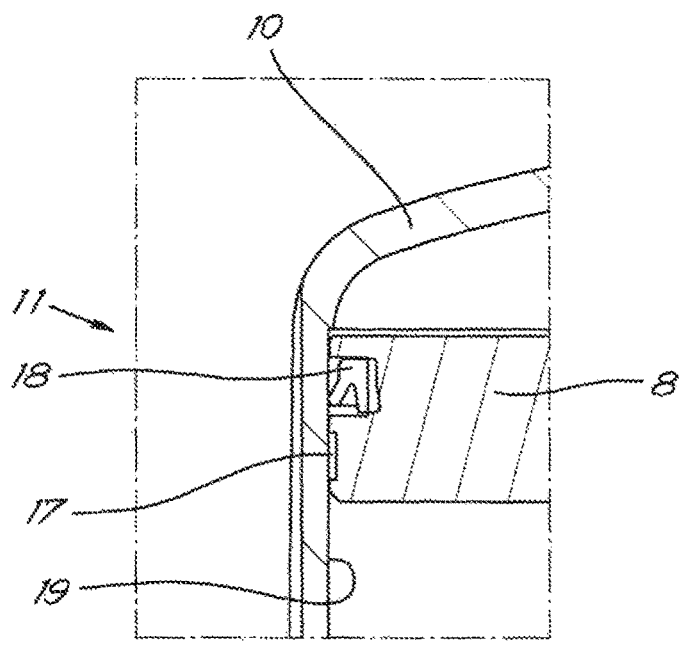

With the intention of better showing the characteristics of the invention, a preferred embodiment of an unloader according to the invention is described hereinafter, by way of an example without any limiting nature, with reference to the accompanying drawings wherein:

FIG. 1 schematically shows an existing embodiment of an unloader;

FIG. 2 schematically shows a preferred embodiment of a mounted unloader according to the invention;

FIG. 3 schematically shows the section indicated in FIG. 2 with F3; and

Figure 4:
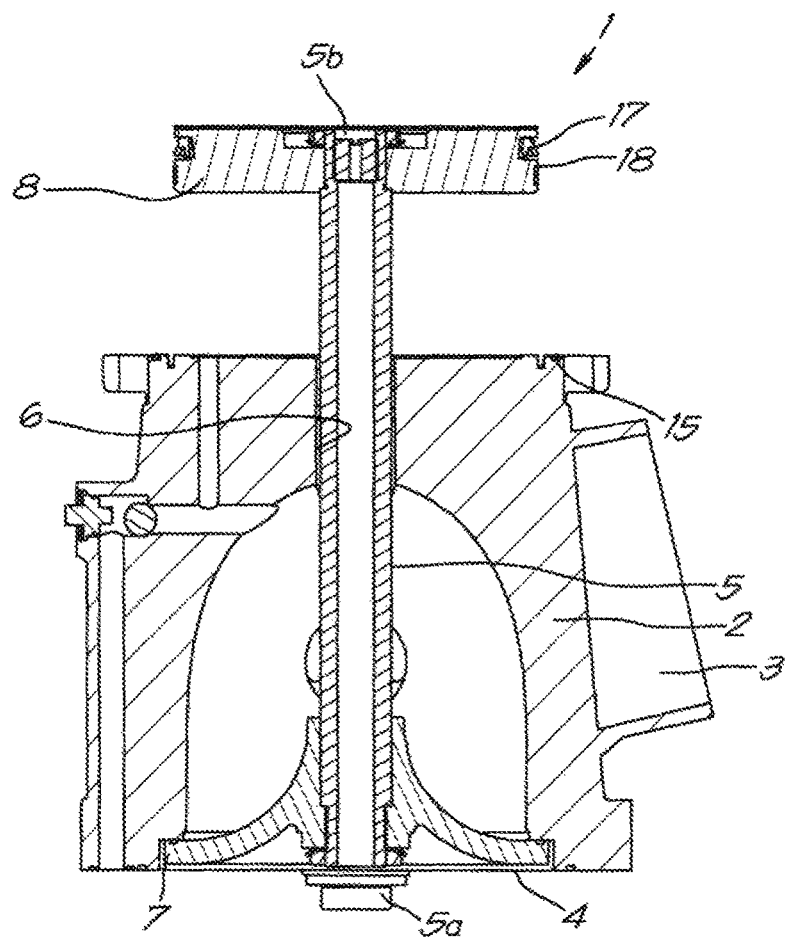

FIG. 4 schematically shows a preferred embodiment of a demounted unloader according to the invention.

FIG. 1 shows an existing embodiment of an unloader 1.

The unloader 1 comprises a housing 2 with an inlet 3 and an outlet 4.

The outlet 4 is intended to be connected to the inlet of a compressor. The inlet 3 of the unloader 1 can be provided with or connected to an inlet filter, which will purify the gas that is sucked in by the compressor.

The unloader 1 is further provided with a piston rod 5 which is arranged moveably in a reciprocating manner in the unloader 1 in a shaft 6 provided for this purpose in the housing 2.

On one end 5a the piston rod 5 is provided with a valve 7 to be able to close said outlet 4 by the reciprocating movement of the piston rod 5 in the housing 2.

On the other end 5b of the piston rod 5, a piston 8 has been arranged moveably in a reciprocating manner in a thereto provided cavity 9 of the unloader 1.

The cavity 9 is provided in the housing 2 and is at least partially delimited by a lid 10 that can be mounted on the housing 2.

As can be clearly deducted from FIG. 1, the reciprocating movement of the piston 8 in the cavity 9 in the known way allows the valve 7 to be moved to close the outlet 4 of the unloader 1 or not.

To move the piston 8, use is made of a pressure difference in the cavity 9 between the top and bottom of the piston 8. To avoid the leakage of gas over the piston 8 as a result of this pressure difference, sealing means 11 have been provided which are applied on the contour of the piston 8.

To replace these sealing means 11, the unloader 1 of the compressor needs to be removed and subsequently the lid 10 needs to be removed by unscrewing the prestressed bolts 12. Subsequently the valve 7 can be detached from the piston rod 5 and the piston 8 can be taken out of the unloader 1 by lifting the piston rod 5 until the piston 8 lifts out of the cavity 9, to then remove and replace the sealing means 11.

FIG. 2 shows a mounted unloader 1 according to the invention.

The structure of the unloader 1 partially corresponds with the structure of the known unloader of FIG. 1.

An important difference is that said cavity 9 in this case is provided in the lid 10. To this end, in this example, the lid 10 is made as a cylindrical casing 13 and a hood 14 or in other words, like a kind of 'hat' on a housing 2 flattened at the top. Between the lid 10 and the housing 2, in this case a seal, for example in the form of an O-ring 15, is provided, however, according to the invention this is not strictly necessary. Evidently, another type of seal, other than an O-ring, can also be applied. The cavity 9 is situated as a free inner space between the lid 10 and the housing 2.

According to a preferred characteristic of the invention, the lid 10 is further provided with a handle or handgrip 16 which, in this example, is provided on top of the lid 10, but can also be provided on a side thereof.

The piston rod 5 runs via a shaft 6 in the housing 2 into said free space 9 under the lid 10, such that the piston 8 can move up and down in the lid 10, more specifically in said cavity 9 or free inner space.

On its contour, the piston 8 is provided with sealing means 11, as shown in FIG. 3. They comprise a slide ring 17 and a seal 18 in this example, which ensure the sealing between the piston 8 and the inside 19 of the lid 10.

In this case, the seal 18 is a single-acting seal 18, as shown in the figure. This means that it will seal completely in one direction. In this case in the direction of the valve 7 toward the top of the lid 10. The invention is not limited to an embodiment comprising a slide ring 17 and a seal 18, however, there are also other possibilities to execute said sealing means, for example by only providing a seal 18 or only a slide ring 17.

To replace the seal 18 and the slide ring 17 in this case only the lid 10 needs to be unscrewed and removed from the housing 2 by unscrewing the bolts 12 and lifting up the lid 10 using the handle or handgrip 16, as shown in the FIGS. 2 and 4.

It goes without saying that the connection between the housing 2 and the lid 10 can be realised in all kinds of ways and is not limited to a bolt connection. For example, clamping means, screws or the like can be used.

By removing the lid 10, the contour of the piston 8 is free and the seal 18 and the slide ring 17 are easily accessible for replacement, by taking them out and putting in a new seal 18 and/or slide ring 17. The seal 18 and the slide ring 17 also remain in place correctly when the lid 10 is put over the piston 8 on the housing 2 and tightened by means of the bolts 12. The piston rod 5 stays fixed in the shaft 6 of the housing 2. Furthermore, when putting the lid 10 back on the housing 2, the lid 10 will slide from top to bottom over the single-acting seal 18, whereby this seal 18 cannot be damaged.

Other advantages are that there is no need to demount the entire unloader 1 from the compressor as the housing 2 can remain mounted on the inlet of the compressor, and that the piston 8 and/or the valve 7 do not need to be detached from the piston rod 5. Further, the inlet of the compressor remains sealed against dirt, as the unloader 1 itself will not be demounted.

The present invention is by no means limited to the embodiments described as an example and shown in the drawings, but an unloader according to the invention as defined by the claims can be realised according to all kinds of variants without departing from the scope of the invention.

The invention claimed is:

1. An unloader for a compressor (1) comprising:
   a housing (2) having an inlet (3), an outlet (4), and an interior housing space,
   a cavity (9) being at least delimited by a dome-shaped lid (10) provided on the housing (2), and
   a piston rod (5), configured to move in a reciprocating manner in the housing (2), a first end (5a) of the piston rod (5) having a valve (7) provided thereon and configured to close the outlet (4) in a direction orthogonal to a direction in which the piston rod is configured to move in the reciprocating manner, and a second end (5b) of the piston rod (5) having a piston (8) arranged thereon, the piston (8) being configured to move in a reciprocating manner in the cavity (9) of the unloader (1) by a pressure difference in the cavity (9) between a top and bottom of the piston (8),
   wherein the unloader includes a sealing means (11) configured to provide leakage-free movement of the piston (8) in said cavity (9),
   wherein the cavity (9) is completely located in or integrated in the dome-shaped lid (10), and the dome-shaped lid is configured such that the piston (8) and the sealing means (11) are freely accessible when the dome-shaped lid (10) is removed, wherein the dome-shaped lid (10) is mounted detachably on the housing (2) by bolts (12), and wherein a horizontal connecting passage is formed in a base of the housing (2), below the upper end of the housing (2), the horizontal connecting passage connecting to a vertical connecting passage formed in the base of the housing (2), the vertical connecting passage connecting to the cavity (9) such that the cavity (9) and the interior space of the housing (2) are in communication with each other.

2. The unloader of claim 1, wherein the dome-shaped lid (10) includes a cylindrical casing (13) and a hood (14), and is configured such that the piston (8) is arranged moveably in a reciprocating manner in the cylindrical casing (13) thereof.

3. The unloader of claim 1, wherein said sealing means (11) are provided between a sealing surface of the piston (8) and a sealing surface of the dome-shaped lid (10).

4. The unloader of claim 1, wherein said sealing means (11) comprise a seal (18) and/or a slide ring (17).

5. The unloader of claim 4, wherein the seal (18) of said sealing means (11) is a single-acting seal (18).

6. The unloader of claim 1, wherein the dome-shaped lid (10) is provided with a handle or handgrip (16).

7. The unloader of claim 1, wherein the inlet (3) is disposed above a seat of the valve (7) in the direction in which the piston rod is configured to move.

8. The unloader of claim 1, wherein the dome-shaped lid (10) includes a flange on a distal end thereof configured for attachment to the housing (2).

9. A method of replacing the sealing means (11) of the unloader (1) of claim 1, said method comprising:
- dismantling the dome-shaped lid (10) of the housing (2) such that the piston (8) becomes freely available,
- replacing at least a portion of the sealing means (11), and
- re-mounting the dome-shaped lid (10) of the housing (2).

10. A compressor comprising:
- an inlet for gas to be compressed and an outlet for compressed gas,
- wherein the compressor is provided with the unloader of claim 1, said unloader (1) having its outlet (4) connected to said inlet of the compressor.

* * * * *